United States Patent [19]

Ono

[11] Patent Number: 5,325,718
[45] Date of Patent: Jul. 5, 1994

[54] DUAL-FREQUENCY VIBRATION SENSOR

[75] Inventor: Hisao Ono, Okazaki, Japan

[73] Assignee: Yupiteru Industries Co., Ltd., Japan

[21] Appl. No.: 832,910

[22] Filed: Feb. 7, 1992

[30] Foreign Application Priority Data

Feb. 13, 1991 [JP] Japan .................. 3-005594[U]

[51] Int. Cl.⁵ ............................................ G01H 11/08
[52] U.S. Cl. ........................................ 73/654; 340/429
[58] Field of Search ................ 73/654, 651; 340/429, 340/683; 310/329

[56] References Cited

U.S. PATENT DOCUMENTS

| | | | |
|---|---|---|---|
| 2,272,984 | 2/1942 | Ritzmann | 73/654 |
| 4,233,836 | 11/1980 | Yoneda et al. | 73/654 |
| 4,373,378 | 2/1983 | Fujishiro et al. | 73/651 |
| 4,732,041 | 3/1988 | Iwata | 73/654 |
| 4,864,288 | 9/1989 | Cross | 340/429 |

Primary Examiner—John E. Chapman
Attorney, Agent, or Firm—Venable, Baetjer, Howard & Civiletti

[57] ABSTRACT

A vibration sensor is secured to an object whose vibrations are to be sensed, and includes a vibration plate capable of resonating at one of first resonance frequencies within a specific high frequency region of the frequencies at which the object can vibrate. A vibration element capable of resonating at one of second resonance frequencies within a specific low frequency region of the frequencies at which the object can vibrate is connected to the vibration plate so that the vibration resulting from the resonance of the vibration element is transmitted to the vibration plate. Further, a piezoelectric transducer element is fixed to the vibration plate, and is able to generate an electric signal in response to the stress applied by the vibration plate when this plate vibrates. Thus, it is possible, with a single sensor, to sense both vibrations composed of relatively high frequency components and vibrations composed of relatively low frequency components.

5 Claims, 2 Drawing Sheets

DUAL-FREQUENCY VIBRATION SENSOR

BACKGROUND OF THE INVENTION

1. Field of the Invention

The present invention relates to a vibration sensor and, more specifically, to a vibration sensor for sensing vibrations that is used in a security system of a vehicle.

2. Description of the Related Art

A security system installed in a vehicle, such as an automobile, includes a motion sensor and a shock sensor, which together constitute a vibration sensor apparatus. The motion sensor is adapted to sense a vibration which is composed of a relatively low frequency component and which may be caused when, for instance, a person gets in or out of the vehicle. The shock sensor is adapted to sense a vibration composed of a relatively high frequency component and which may be caused when, for instance, the body of the vehicle is hit, or when the door, the trunk, the bonnet, etc. of the vehicle is opened by force.

However, it is difficult to reduce the size of a security system if it includes a vibration sensor apparatus consisting of a motion sensor and a shock sensor. For this reason, it is desirable that a vibration sensor apparatus for use in a security system of a vehicle consist of a single sensor, and yet be capable of sensing both vibrations composed of high frequency components and vibrations composed of low frequency components. In other words, such a vibration sensor apparatus is desired to be able to sense vibrations of not more than 10 Hz in order to detect a motion with respect to the vehicle, and also able to sense vibrations of from 100 to seven hundred Hz in order to detect a shock applied to the vehicle.

SUMMARY OF THE INVENTION

An object of the present invention is to provide a vibration sensor which consists of a single sensor unit and which is capable of sensing, among possible vibrations of an object for which the sensor is provided, both vibrations composed of low frequency components and those composed of high frequency components.

In order to achieve the above object, according to the present invention, there is provided a vibration sensor comprising: a vibration plate secured to an object whose vibrations are to be sensed, the vibration plate being capable of resonating at a first resonant frequency within a first specific range of the frequencies at which the object can vibrate; a vibration element connected to the vibration plate, the vibration element being capable of resonating at a second resonant frequency within a second specific range of the frequencies at which the object can vibrate, the second specific range lying lower than the first specific range, the vibration element transmitting the vibration resulting from the resonance thereof to the vibration plate; and a piezoelectric transducer element fixed to the vibration plate, the piezoelectric transducer element being capable of generating an electrical signal in response to the stress applied by the vibration plate when the vibration plate vibrates.

In a preferred embodiment of the present invention, the vibration plate comprises a metal plate, and the vibration element comprises an elastic member having an end fixed to the metal plate, and a weight fixed to the other end of the elastic member.

Further, in a preferred embodiment of the present invention, the vibration plate has a natural frequency within the range from 100 to several 100 Hz, and the vibration element has a natural frequency of not more than 10 Hz.

With the above-specified vibration sensor, when the object whose vibrations are to be sensed undergoes vibration at a frequency within a relatively low frequency region, the vibration element resonates with the object. The vibration resulting from this resonance is transmitted via the vibration plate to the piezoelectric transducer element so that the piezoelectric transducer element generates an electric signal in accordance with the stress applied by the vibration plate. When the object vibrates at a frequency within a relatively high frequency region higher than the region within which the vibration element can resonate and, accordingly, only the vibration plate resonates with the object, the vibration resulting from the resonance of the vibration plate is transmitted to the piezoelectric transducer element, which outputs an electrical signal in accordance with the stress applied by the vibration plate. Thus, the vibration plate has two resonance points with respect to the individual ranges of resonance frequencies, and is able to vibrate at one of the resonance point. The vibration of the vibration plate causes strain to be applied to the piezoelectric transducer element. The piezoelectric transducer element converts the strain into an electrical signal, whereby the vibration of the object is sensed. This arrangement enables a single sensor unit to provide both the function of a motion sensor and that of a shock sensor.

DESCRIPTION OF THE PREFERRED EMBODIMENTS

Figure 1:
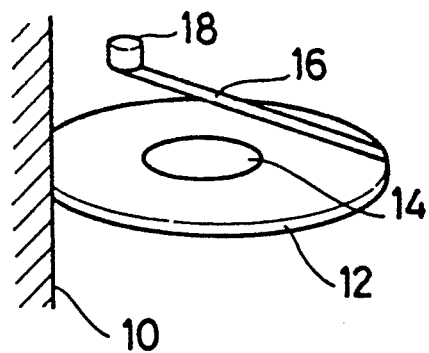
FIG. 1 is a perspective view of a vibration sensor according to an embodiment of the present invention.

An embodiment of the present invention will be described with reference to the drawings. Referring to FIG. 1, a disk-shaped metal plate 12 is secured to a wall surface of the body 10 of a vehicle (hereinafter abbreviated to "the body") whose vibrations are to be sensed. The material and the configuration of the metal plate 12 are such that the metal plate 12 is able to resonate with the body 10 at a frequency within a certain range of the frequencies at which the body 10 can vibrate, for example, at a frequency within the range from 100 to several 100 Hz. The metal plate 12 is thus constructed to constitute a vibration plate. A circular piezoelectric transducer element 14 is fixed to a central portion of the metal plate 12. Further, a wire 16, comprised of an elastic member, has a first end fixed to an edge portion of the metal plate 12, and a second end positioned above the metal plate 12, the second end carrying a weight 18 fixed thereto. The wire 16 and the weight 18 together constitute a vibration element. When the metal plate 12 vibrates due to a certain type of vibration of the body 10, the vibration element resonates at a frequency which are within a certain range of the possible vibration frequencies of the body 10, and which are lower than the natural resonance frequency of the metal plate 12, for example, at a frequency of not more than 10 Hz.

Figure 2A:
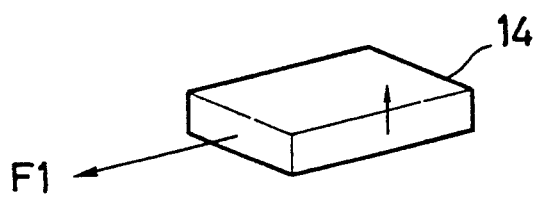
FIGS. 2A to 2C are diagrams for illustrating the operation of a piezoelectric transducer element of the vibration sensor shown in FIG. 1.
Figure 2B:
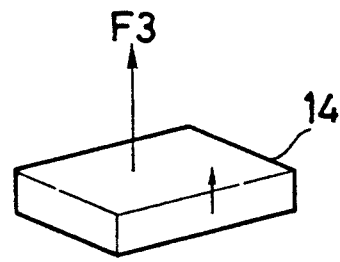
Figure 2C:
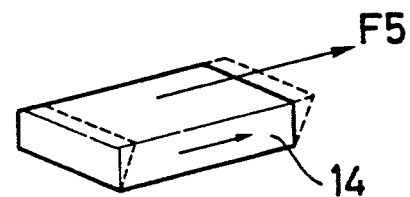

The piezoelectric transducer element 14 is constructed by utilizing the piezoelectric effect of a polarizable ceramic material. When a force acts on the polarization axis of the element of a ceramic material, a voltage is generated across the electrodes of the element 14. Specifically, such a generation of voltage occurs when a stretching and compacting force F1 perpendicular to the polarization axis is applied (as shown in FIG. 2A), when a stretching and compacting force F3 parallel to the polarization axis is applied (as shown in FIG. 2B), or when a sliding stress F5 causing a sliding strain on the plane parallel to the polarization axis is applied (as shown in FIG. 2C). The piezoelectric transducer element 14 is able to generate voltage across the electrodes in response to both the strain caused at the natural resonance point of the metal plate 12 and the strain caused at the resonance point of the metal plate 12 induced by a vibration of the weight 18 and the wire 16.

With the above-described construction, when the body 10 is caused to vibrate at a relatively low frequency by, for instance, motion of a person getting in or out of the vehicle, or motion of the body 10 being shaken, the weight 18 and the wire 16 resonate with the body 10 at a frequency of not more than 10 Hz. This resonance causes a vibration, which is transmitted via the vibration plate 12 to the piezoelectric transducer element 14. In response to the transmitted vibration, the piezoelectric transducer element 14 outputs an electrical signal in accordance with that frequency (not more than 10 Hz).

On the other hand when the body 10 is caused to vibrate at a relatively high frequency by a shock given by, for instance, hitting the body 10, dismounting a tire, or forcibly opening the door, trunk or bonnet, the metal plate 12 resonates with the body 10 at a frequency of from 100 to several 100 Hz. This resonance causes a vibration, which is transmitted to the piezoelectric transducer element 14. In response to the stress caused by the transmitted vibration, the piezoelectric transducer element 14 outputs a corresponding electrical signal. The signal output from the piezoelectric transducer element 14 is supplied to the associated security system. The supply of a detection signal from the piezoelectric transducer element 14 to the security system enables the system to generate an alarm signal, and provide a security function for the vehicle.

Figure 3:
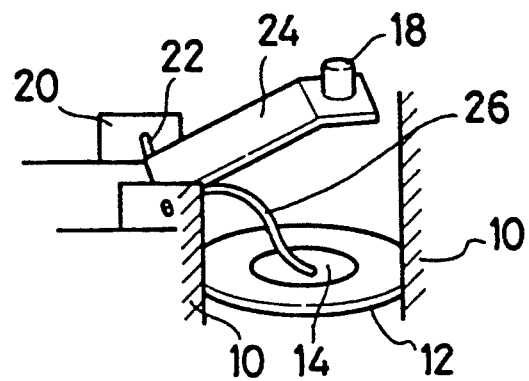
FIG. 3 is a perspective view of a vibration sensor according to another embodiment of the present invention.

The vibration element may alternatively have the following construction: As shown in FIG. 3, a shaft 22 is fixed to flanges 20 of the body 10, and a support 24 is swingably joined, at one end thereof, to the shaft 22. A portion at the other end of the support 24 is bent, and a weight 18 is fixed to the bent portion of the support 24. A plate spring 26 is fixed, at one end thereof, to a reverse surface portion of the support 24. The other end of the plate spring 26 is connected to the piezoelectric transducer element 14. The above construction enables the same effect as of the previous embodiment to be obtained.

Figure 4:
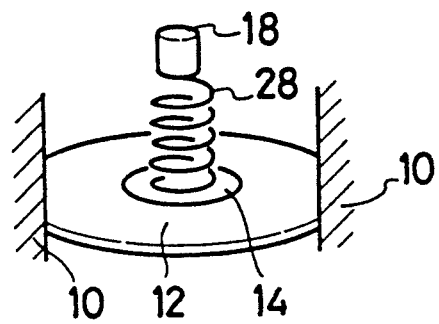
FIG. 4 is a perspective view of a vibration sensor according to a further embodiment of the present invention.
Figure 5:
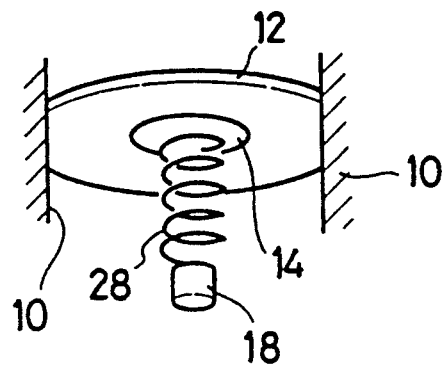
FIG. 5 is a perspective view of a vibration sensor according to a still further embodiment of the present invention.

Still alternatively, the vibration element may have the following construction: As shown in FIG. 4, a coil spring 28 is provided on the piezoelectric transducer element 14 with one end of the coil spring 28 connected to the element 14. A weight 18 is fixed to the other end of the coil spring 28. In another alternative, the vibration element has a construction such as that shown in FIG. 5. While the piezoelectric transducer element 14 is fixed to a portion of the reverse surface of the metal plate 12, one end of a coil spring 28 is connected to the piezoelectric transducer element 14 with a weight 18 fixed to the other end of the coil spring 28. Each of these constructions enables the same effect as of the previous embodiment to be obtained.

In each of the foregoing embodiment, the metal plate 12 is equivalent in function to a shock sensor having a resonance point within a range from 100 to several 100 Hz, and a suitable combination of the wire 16, the weight 18, the plate spring 26, the support 24 and the coil spring 28 is equivalent in function to a motion sensor capable of sensing frequencies of not more than 10 Hz. This arrangement is combined with the provision of the piezoelectric transducer element 14 on the metal plate 12 having two resonance points, thereby achieving a vibration sensor which is, though consisting of a single sensor unit, capable of providing the function of both a motion sensor and a shock sensor.

As described above, according to the present invention, a vibration sensor includes a vibration plate having a plurality of resonance points. When an object for which the sensing is performed vibrates at a relatively low frequency among the possible vibration frequencies of the object, a vibration element of the sensor resonates with the object, whereas, when the object vibrates at a relatively high frequency, the vibration plate itself resonates. The stress at one of the resonance points is applied to a piezoelectric transducer element of the sensor so that a vibration composed of either a shock component or a motion component can be detected. Thus, it is possible for a vibration sensor consisting of a single sensor unit to function as both a shock sensor and a motion sensor, thereby making it possible to simplify the construction of the entire system.

What is claimed is:

1. A vibration sensor, comprising:
a vibration plate secured to an object whose vibrations are to be sensed, said vibration plate having a natural frequency within the range from 100 to 700 Hz for resonating within a first specific range of the frequencies at which said object can vibrate;
a vibration element connected to said vibration plate, said vibration element having a natural frequency of not more than 10 Hz for resonating within a second specific range of frequencies at which said object can vibrate, said second specific range lying lower than said first specific range, said vibration element transmitting the vibration resulting from the resonance thereof to said vibration plate, and
a piezoelectric transducer element fixed to said vibration plate, said piezoelectric transducer element being capable of generating an electrical signal in response to the stress applied by said vibration plate when said vibration plate vibrates.

2. A vibration sensor according to claim 1, wherein said vibration plate comprises a metal plate, and said vibration element comprises an elastic member having an end fixed to said metal plate, and a weight fixed to the other end of said elastic member.

3. A vibration sensor according to claim 1, wherein said object is the body of a vehicle, said vibration plate comprising a disk-shaped metal plate secured to said body, said vibration element comprising an elastic wire having a first end fixed to an edge portion of said metal plate and a second end positioned above said metal plate, and a weight fixed to said second end of said elastic wire, said piezoelectric transducer element being positioned in the center of said disk-shaped metal plate.

4. A vibration sensor for sensing vibrations of the body of a vehicle, comprising:
- a disk-shaped metal plate secured to said body, said metal plate being capable of resonating at a first resonant frequency among the frequencies at which said body can vibrate, said first resonant frequency ranging from 100 to 700 Hz and;
- a vibration element comprising a shaft secured to said body, a support swingably joined to said shaft, a weight provided on said support, and a plate spring having an end fixed to a reverse surface portion of said support, said vibration element being capable of resonating at a second resonant frequency among the frequencies at which said body can vibrate, said second resonant frequency being not more than 10 Hz; and
- a piezoelectric transducer element fixed to a central portion of said metal plate and connected to the other end of said plate spring, said piezoelectric transducer element being capable of generating an electrical signal in response to the stress applied when said metal plate and said vibration element vibrate.

5. A vibration sensor for sensing vibrations of the body of a vehicle, comprising:
- a disk-shaped metal plate capable of resonating at a first resonant frequency among the frequencies at which said body can vibrate, said first resonant frequency ranging from 100 to 700 Hz;
- a piezoelectric transducer element fixed to a central portion of said metal plate, said piezoelectric transducer element being capable of generating an electrical signal in response to the stress applied by said metal plate when said metal plate vibrates; and
- a vibration element comprising a coilspring having an end fixed to said piezoelectric transducer element, and a weight fixed to the other end of said coil spring, said vibration element being capable of resonating at a second resonant frequency among the frequencies at which said body can vibrate, said second resonant frequency being not more than 10 Hz, said vibration element transmitting vibration thereon to said piezoelectric transducer element to generate an electrical signal.

* * * * *